United States Patent
Ramesh et al.

(10) Patent No.: US 12,243,226 B2
(45) Date of Patent: Mar. 4, 2025

(54) BI-DIRECTIONAL QUANTUM ANNEALING IN MARKOV RANDOM FIELDS FOR MACHINE LEARNING IN IMAGE ANALYSIS

(71) Applicant: Accenture Global Solutions Limited, Dublin (IE)

(72) Inventors: Shreyas Ramesh, Mountainside, NJ (US); Kung-Chuan Hsu, Cerritos, CA (US); Max Howard, San Francisco, CA (US); Hassan Naseri, Helsinki (FI)

(73) Assignee: Accenture Global Solutions Limited, Dublin (IE)

( * ) Notice: Subject to any disclaimer, the term of this patent is extended or adjusted under 35 U.S.C. 154(b) by 429 days.

(21) Appl. No.: 17/690,662

(22) Filed: Mar. 9, 2022

(65) Prior Publication Data
US 2022/0292675 A1 Sep. 15, 2022

Related U.S. Application Data

(60) Provisional application No. 63/159,786, filed on Mar. 11, 2021.

(51) Int. Cl.
*G06T 7/00* (2017.01)
*G06N 3/044* (2023.01)
(Continued)

(52) U.S. Cl.
CPC .......... *G06T 7/0012* (2013.01); *G06N 3/044* (2023.01); *G06N 3/047* (2023.01); *G06N 3/08* (2013.01);
(Continued)

(58) Field of Classification Search
CPC ...... G06T 7/0012; G06N 3/044; G06N 3/047; G06N 3/08; G06N 10/20; G06N 3/045;
(Continued)

(56) References Cited

U.S. PATENT DOCUMENTS 10,592,816 B1 3/2020 Hsu et al.
2020/0320424 A1* 10/2020 Yarkoni ................ G06N 10/00
(Continued)

OTHER PUBLICATIONS

Venturelli, D. and Kondratyev, A., 2018. Reverse Quantum Annealing Approach to Portfolio Optimization Problems. arXiv preprint arXiv:1810.08584.*
(Continued)

*Primary Examiner* — Zhitong Chen
(74) *Attorney, Agent, or Firm* — Polsinelli PC (57) ABSTRACT

Methods, systems, and apparatus for a bi-directional quantum annealing approach to Markov random field networks for machine learning in image analysis. In one aspect, a method includes obtaining training data comprising features extracted from a first set of images; training a deep quantum restricted Boltzmann machine (QRBM) comprising multiple layers using the training data, the training comprising layer-wise training of the multiple layers, wherein training each layer of the multiple layers comprises evaluating a restricted Boltzmann machine (RBM) probability distribution using bi-directional quantum annealing; and validating the trained deep QRBM using test data comprising features extracted from a second set of images.

21 Claims, 9 Drawing Sheets

(51) Int. Cl.
*G06N 3/047* (2023.01)
*G06N 3/08* (2023.01)
*G06N 10/20* (2022.01)
*G06V 10/764* (2022.01)
*G06V 10/776* (2022.01)
*G06V 10/82* (2022.01)

(52) U.S. Cl.
CPC ........... *G06N 10/20* (2022.01); *G06V 10/764* (2022.01); *G06V 10/776* (2022.01); *G06V 10/82* (2022.01)

(58) Field of Classification Search
CPC ...... G06N 3/084; G06N 10/60; G06V 10/764; G06V 10/776; G06V 10/82
See application file for complete search history.

(56) References Cited

U.S. PATENT DOCUMENTS

2021/0316157 A1  10/2021  Lynch et al.
2021/0342730 A1* 11/2021  Redmond .............. G06N 10/40

OTHER PUBLICATIONS

Adachi, S.H. and Henderson, M.P., 2015. Application of quantum annealing to training of deep neural networks. arXiv preprint arXiv:1510.06356.*

1QBit.com [online], "XrAI Trans Canadian Roll Out To Fight COVID-19," May 7, 2020, retrieved on Jun. 9, 2022, retrieved from URL<https://1qbit.com/news/xrai-trans-canadian-roll-fight-covid-19/>, 5 pages.

Ackley et al., "A Learning Algorithm for Boltzmann Machines," Cog. Science, 1985, 9(1):147-169.

Albash et al., "Adiabatic Quantum Computation," Rev. Mod. Physics, Jan. 29, 2018, 90:015002, 64 pages.

Amin et al., "Quantum Boltzmann Machine," Phys. Rev. X, May 23, 2018, 8:021050, 11 pages.

Apolloni et al., "A Numerical Implementation of Quantum Annealing," Proceedings of the Stochastic Processes, Physics and Geometry, Ascona/Locarno, Switzerland, Jul. 4-9, 1998, 97-111.

Burda et al., "Accurate and Conservation Estimates of MRF Log-likelihood using Reverse Annealing," arXiv, Dec. 30, 2014, arXiv:1412.8566v1, 9 pages.

Crosson et al., "Prospects for Quantum Enhancement with Diabatic Quantum Annealing," arXiv, Aug. 22, 2020, arXiv:2008.09913v1, 26 pages.

Dixit et al., "Training a Quantum Annealing Based Restricted Boltzmann Machine on Cybersecurity Data," arXiv, Nov. 24, 2020, arXiv:2011.13996v1, 10 pages.

DWaveSys.com [online], "Hybrid Solvers," available on or before Oct. 1, 2020, via Internet Archive: Wayback Machine URL<https://web.archive.org/web/20201001053531/https://docs.ocean.dwavesys.com/en/stable/overview/hybrid.html>, retrieved on Jun. 9, 2022, retrieved from URL<https://docs.ocean.dwavesys.com/en/stable/overview/hybrid.html>, 2 pages.

Grosse et al., "Sandwiching the Marginal Likelihood using Bidirectional Monte Carlo," arXiv, Nov. 8, 2015, arXiv:1511.02543v1, 32 pages.

Koshka et al., "Towards Sampling from Nondirected Probabilistic Graphical Models using a D-Wave Quantum Annealer," arXiv, May 1, 2019, arXiv:1905.00159v1, 11 pages.

Mazzanti et al., "Efficient Evaluation of the Partition Function of RBMs with Annealed Importance Sampling," arXiv, Jul. 23, 2020, arXiv:2007.11926v1, 11 pages.

Neal, "Annealed Importance Sampling," arXiv, Sep. 4, 1998, arXiv:physics/9803008v2, 25 pages.

Rocutto et al., "Quantum Semantic Learning by Reverse Annealing of an Adiabatic Quantum Computer," arXiv, Mar. 27, 2020, arXiv:2003.11945v2, 27 pages.

Rosenberg et al., "Building an iterative heuristic solver for a quantum annealer." Comput. Optim. Applications, Apr. 23, 2016, 65:845-869.

Sleemane et al., "A Hybrid Quantum Enabled RBM Advantage: Convolutional Autoencoders for Quantum Image Compression and Generative Learning," arXiv, Jan. 31, 2020, arXiv:2001.11946v1, 15 pages.

Adachi et al., "Application of Quantum Annealing to Training of Deep Neural Networks," CoRR, submitted on Oct. 21, 2015, arXiv:1510.06356v1, 18 pages.

EP Extended Search Report in European Appln. No. 22161432.4, dated Sep. 12, 2022, 8 pages.

Pelofske et al., "Advanced anneal paths for improved quantum annealing," CoRR, submitted on Sep. 10, 2020, arXiv:2009.05008v1, 20 pages.

Venturelli et al., "Reverse Quantum Annealing Approach to Portfolio Optimization Problems," CoRR, submitted on Oct. 25, 2018, arXiv:1810.08584v2, 19 pages.

* cited by examiner

BI-DIRECTIONAL QUANTUM ANNEALING IN MARKOV RANDOM FIELDS FOR MACHINE LEARNING IN IMAGE ANALYSIS

TECHNICAL FIELD

The present invention relates to quantum computing and machine learning.

BACKGROUND

Example Markov random field networks include Boltzmann machines. A Boltzmann machine is a stochastic recurrent neural network that can be used to extract meaningful features and patterns from a database. It is commonly used as building blocks of very useful deep learning models such as deep belief network and deep Boltzmann machines. The training of Boltzmann machines employ stochastic learning algorithms, which can be slow when there are no restrictions on the neurons' connectivity. Restricted Boltzmann machines constrained the neurons to form a bipartite graph of visible and hidden layers, which allows for more efficient training through algorithms, such as the gradient descent-based contrastive divergence algorithm.

Quantum annealing is a metaheuristic for finding a global minimum of an objective function over a given set of candidate solutions by a process using quantum fluctuations. Quantum annealing starts from a superposition of candidate states with equal weights. Then the system evolves following the time-dependent Schrödinger equation. The amplitudes of all candidate states keep changing, realizing a quantum parallelism, according to the time-dependent strength of the transverse field, which causes quantum tunneling between states. If the rate of change of the transverse field is slow enough, the system stays close to the ground state of the instantaneous Hamiltonian. The transverse field is finally switched off, and the system is expected to have reached the ground state of the classical Ising model that corresponds to the solution to the original optimization problem.

SUMMARY

This specification describes methods and systems for applying a bi-directional quantum annealing approach to Markov random field networks for machine learning in image analysis. The approach applies quantum annealing in both the forward and reverse manner, hence bi-directional, in order to enhance the training of Boltzmann machines and to better assess the quality of the samples drawn from a Markov random field network.

In general, one innovative aspect of the subject matter described in this specification can be implemented in a method that includes obtaining training data comprising features extracted from a first set of images; training a deep quantum restricted Boltzmann machine (QRBM) comprising multiple layers using the training data, the training comprising layer-wise training of the multiple layers, wherein training each layer of the multiple layers comprises evaluating a restricted Boltzmann machine (RBM) probability distribution using bi-directional quantum annealing; and validating the trained deep QRBM using test data comprising features extracted from a second set of images.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations images in the first set of images and second set of images comprise medical imaging images.

In some implementations each layer of the multiple layers included in the deep QRBM comprises a RBM, and wherein training each layer of the multiple layers included in the deep QRBM comprises: embedding the RBM into a quantum annealing device; receiving a sampled target Boltzmann distribution from the quantum annealing device; computing a gradient of a log-likelihood function; and applying gradient descent to update parameters of the RBM.

In some implementations embedding the RBM into a quantum annealing device comprises: determining an energy function of the RBM underlying Boltzmann distribution; and providing the energy function to a quantum annealing device, wherein the quantum annealing device implements bi-directional quantum annealing.

In some implementations the energy function comprises an Ising function or a quadratic unconstrained binary optimization (QUBO) function and the target Boltzmann distribution corresponds to a low energy state of the Ising function or QUBO function.

In some implementations the gradient of the log-likelihood function comprises terms that are dependent on the training data, and wherein computing the gradient of the log-likelihood function comprises directly computing the terms that are dependent on the training data.

In some implementations the gradient of the log-likelihood function comprises terms that are dependent on the RBM, and wherein computing the gradient of the log-likelihood function comprises statistically computing the terms that are dependent on the RBM based on samples drawn from the RBM.

In some implementations the method further comprises, in response to determining that validation criteria are met, providing the trained deep QRBM for image classification of new images or, in response to determining that validation criteria are not met, repeating training and validating of the deep QRBM.

The subject matter described in this specification can be implemented in particular ways so as to realize one or more of the following advantages.

Modern healthcare facilities implement TPS (Treatment Planning System) software to manage visits, procedures and schedules for doctors and patients. Medical image analysis is an important component in many treatment options that are managed via TPS. This step requires a specialist to examine sets of CT or MM images holistically and annotate diseased tissue. Anomaly detection is one quality control measure that enables responsive care. Mostly, specialists are able to accurately label images. However, anomalies can occur during this critical task.

The techniques described in this specification leverage quantum annealing in training and assessing quantum machine learning (QML) models, and benchmark against classical ML models for inferences and analyses of images, e.g., DICOM images from CT scans. The techniques apply bi-directional quantum annealing (BDQA) to evaluate efficiently (quantum) Markov Random Field (MRF) models, and thereby improve the training process, which increases the applicability and usability of such methods in practical ML problems. In addition, the performance of trained models surpass classical models due to the capability of BDQA in the training of Deep Boltzmann Machines (DBM). Increased model performance is particularly important in settings such as medical image analysis where error tolerance is low.

In addition, the presently described techniques can be used to generate a practical large, and complex neural network without the need to embed the entire neural network on a quantum computer, since the neural network is broken up into many layers that can be individually treated by quantum methodologies whilst the inter-layer information merging can be handled by classical layer-wise training techniques. Accordingly, the techniques are scalable with the size of hardware and are also particularly suitable for near term quantum computing devices, e.g., Noisy Intermediate-Scale Quantum (NISQ) devices.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for machine learning, e.g., in image analysis.

The techniques include a bi-directional quantum annealing approach to improve the accuracy of evaluating probability distributions in Markov Random Field (MRF) models, e.g., Boltzmann machines. This approach improves the quality of samples and creates empirical error bounds for MRF evaluation. The training of MRF models can be enhanced from the improved sampling, and more efficient training protocols can be designed for MRF models.

In addition, the techniques include Deep Boltzmann Machines (DBM) that concatenate multiple layers of Quantum Restricted Boltzmann Machines (QRBM) to improve the complexity and capability of the Machine Learning (ML) model. Layer-wise training, as well as protocols that involve training multiple layers in one step (which requires accurate sampling from multi-layer QRBMs), can be implemented.

Example Hardware

Figure 1:
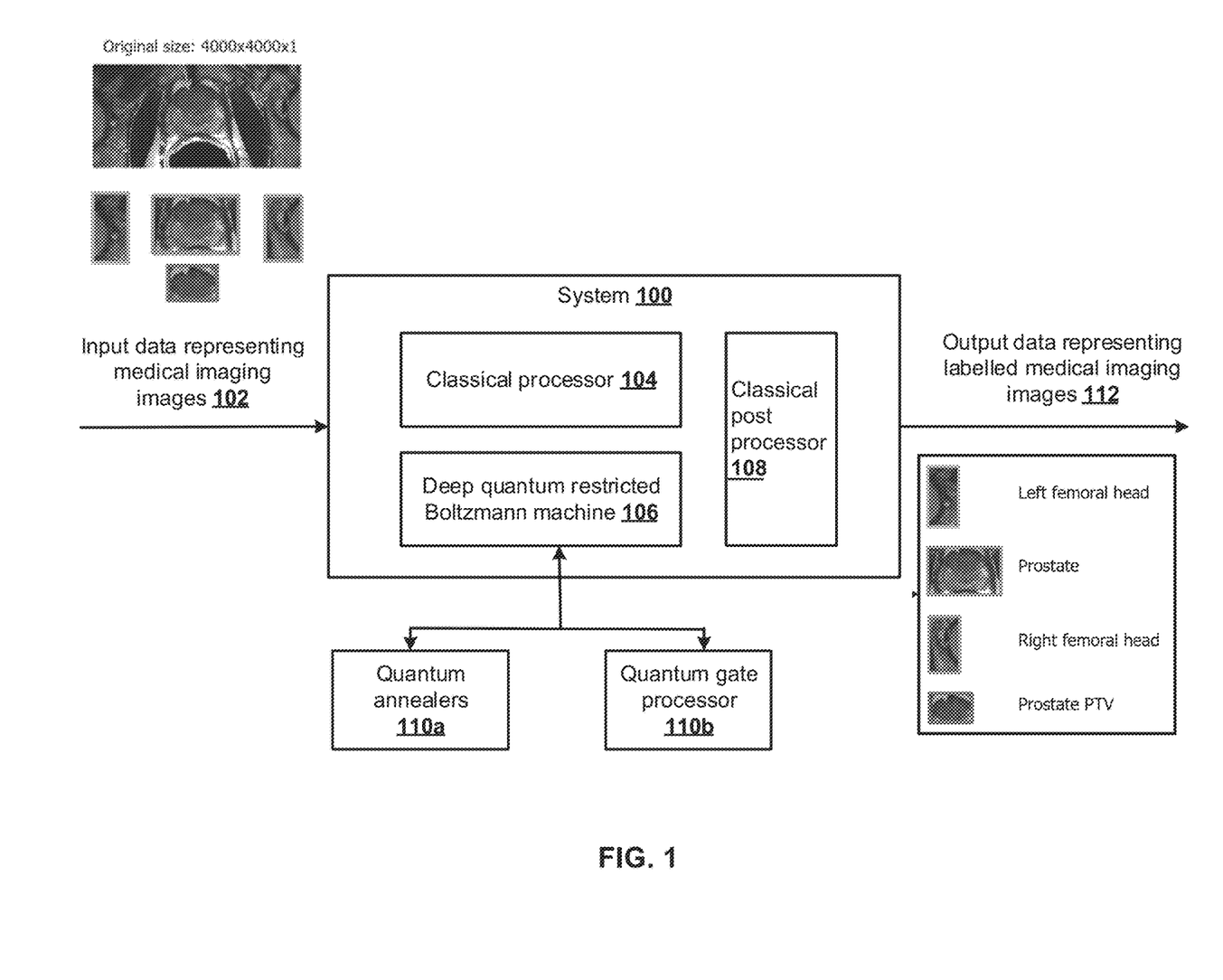
FIG. 1 shows an example system for generating labelled images.

FIG. 1 depicts an example system 100 for generating labelled images. The system 100 is an example of a system implemented as computer programs on one or more classical or quantum computing devices in one or more locations, in which the systems, components, and techniques described below can be implemented.

The system 100 includes a classical processor 104, a deep quantum restricted Boltzmann machine 106, a classical post-processor 108, and one or more quantum computing resources, e.g., quantum annealer 110a and quantum gate processor 110b. For convenience, two additional quantum computing resources are shown in FIG. 1, with the quantum computing resources being external to the system 100. However in some implementations the system 100 may be in communication with more or fewer additional quantum computing resources, or the system 100 may include the quantum computing resources. Components of the system 100 may be in data communication with each of the additional quantum computing resources, e.g., through a communication network such as a local area network or wide area network.

The system 100 is configured to receive as input data representing medical imaging images 102. The system 100 processes the received input data 102 to generate as output data representing labelled medical imaging images 112.

The system 100 is configured to train the deep quantum restricted Boltzmann machine 106 to label input images. For example, in an intensity modulated radiation therapy (IMRT) treatment plan setting, the deep quantum restricted Boltzmann machine 106 can be trained to identify and label organs and tumors/cancers in medical imaging images.

The classical processor 104 is configured to receive image data inputs and to process the received data inputs, e.g., draw boundaries within the images and perform feature extraction, to generate training data and test data Example operations performed by the classical processor 104 are described below with reference to FIG. 2.

The deep quantum restricted Boltzmann machine 106 is configured to process training data generated by the classical processor 104 as part of a training process implemented by the system 100. The training includes layer-wise training of multiple layers included in the deep quantum Boltzmann machine, where training each layer of the multiple layers includes evaluating a restricted Boltzmann machine (RBM) probability distribution using bi-directional quantum annealing, as described below with reference to FIGS. 2 and 3.

The classical post processor 108 is configured to validate the trained deep quantum restricted Boltzmann machine using the test data generated by the classical processor 104. Example operations performed by the classical post processor 108 are described below with reference to FIG. 2.

The system 100 is configured to determine energy functions of Boltzmann distributions corresponding to RBMs included in the deep quantum restrictive Boltzmann machine 106 and provide the energy functions to a quantum computing resource, where the quantum computing resource implements bi-directional quantum annealing.

The quantum computing resources can include quantum annealer computing resources, e.g., quantum annealer 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

The quantum computing resources may include one or more quantum gate processors, e.g., quantum gate processor 110*b*. A quantum gate processor includes one or more quantum circuits, i.e., models for quantum computation in which a computation is performed using a sequence of quantum logic gates, operating on a number of qubits (quantum bits).

Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to directly performing the corresponding adiabatic quantum annealing process using a quantum annealer device, since not all quantum annealer devices can realize physical quantum systems that represent an optimization problem. For example, some quantum annealer devices may not provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The quantum computing resources that receive energy functions from the system 100 are configured to perform bi-directional quantum annealing and provide the system 100 with sampled target Boltzmann distributions as part of the process for training the deep quantum restricted Boltzmann machine 106.

Once trained, the system 100 can provide the deep quantum restricted Boltzmann machine 106 for image classification/labelling on new images, e.g., as part of a process for generating medical treatment plans.

Programming the Hardware

Figure 2:
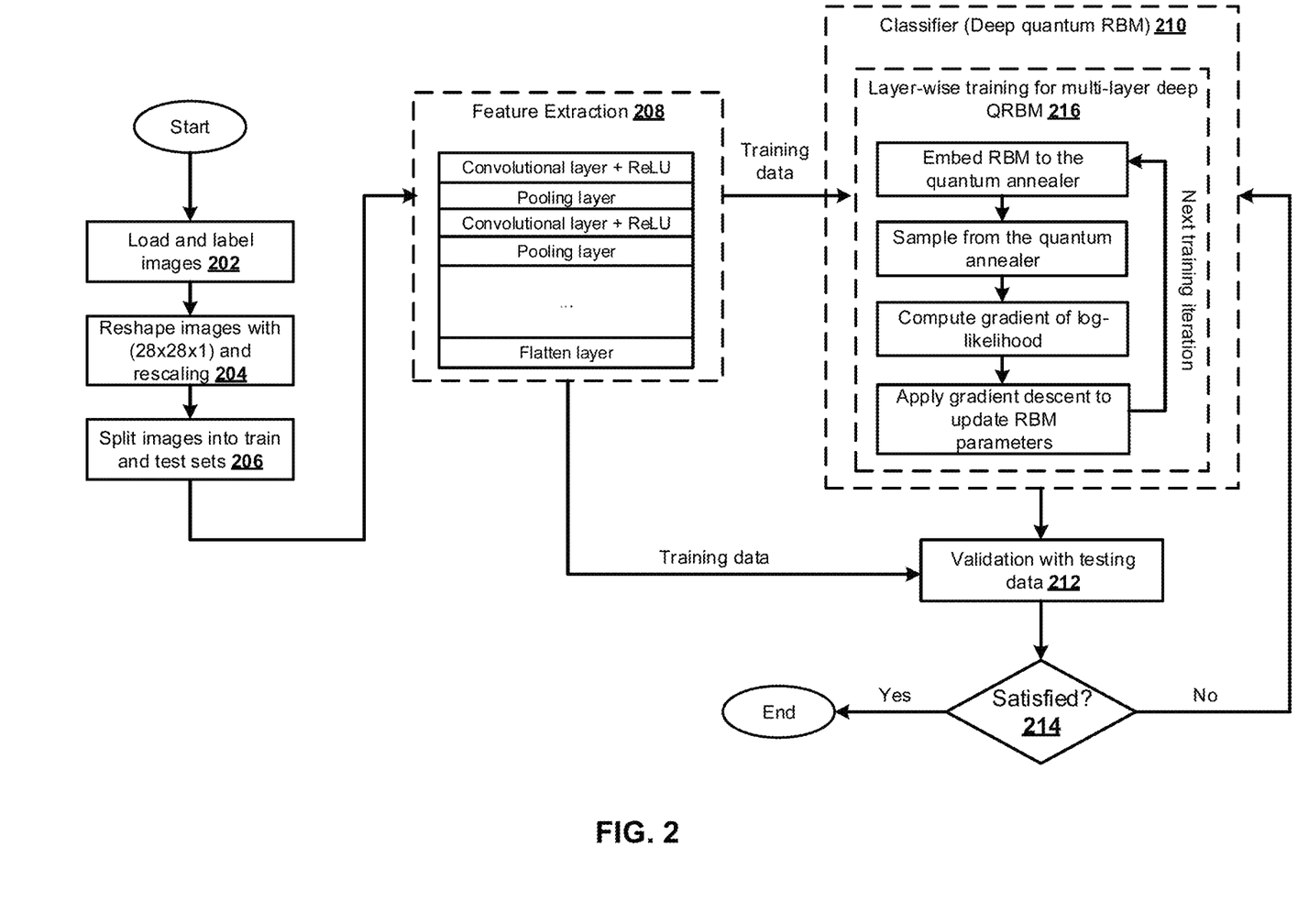
FIG. 2 is a flowchart of an example process for training an image classifier or generative model using a deep quantum restricted Boltzmann machine.

FIG. 2 is a flowchart of an example process 200 for training an image classifier or generative model using a deep quantum restricted Boltzmann machine. For convenience, the process 200 will be described as being performed by a system of one or more classical and quantum computing devices located in one or more locations. For example, example system 100 of FIG. 1, appropriately programmed in accordance with this specification, can perform the process 200.

The system loads and labels multiple images (step 202). The images can include medical imaging images, e.g., CT scans and MRI images. In some implementations the system can also reshape the multiple images, e.g., with 28×28×1 and/or rescale the multiple images (step 204).

The system splits the multiple images into a training set of images and a test set of images (step 206).

The system performs feature extraction on images in the training set of images and images in the test set of images (step 208). In some implementations the system performs feature extraction by processing the images in the training set of images and images in the test set of images using a convolutional neural network, e.g., a convolutional neural network including multiple convolutional neural network layers interleaved with pooling layers and a flattening layer.

The system trains a deep quantum restricted Boltzmann machine (QRBM) using features extracted from images in the training set of images (step 210). The deep QRBM includes multiple layers. The training procedure is a hybrid training procedure with layer-wise training between the multiple layers. Training of a single-layer is implemented with quantum-enhanced gradient descent approaches, e.g., bi-directional quantum annealing for Markov random field model evaluation, as described in detail below with reference to FIG. 3. Performing layer-wise training of the multiple layers can provide several technical advantages. For example, layer-wise training can be used to generate a practical large complex neural network without the need to embed the entire neural network on a quantum computer, since the neural network is broken up into many layers that can be individually treated by quantum methodologies, while the inter-layer information merging can be handled by classical layer-wise training techniques.

The system validates the trained deep QRBM using features extracted from images in the test set of images (step 212). In some implementations the validation can be cross validation. In response to determining that validation criteria are met (step 214), the system provides the trained deep QRBM for image classification of new images, e.g., as part of an IMRT treatment plan system as described in more detail below with reference to FIGS. 4-9. In response to determining that validation criteria are not met (step 216), the system repeats steps 210 and 212. In some implementations the validation criteria can include a predetermined threshold for convergence of the cost function (log likelihood).

Figure 3:
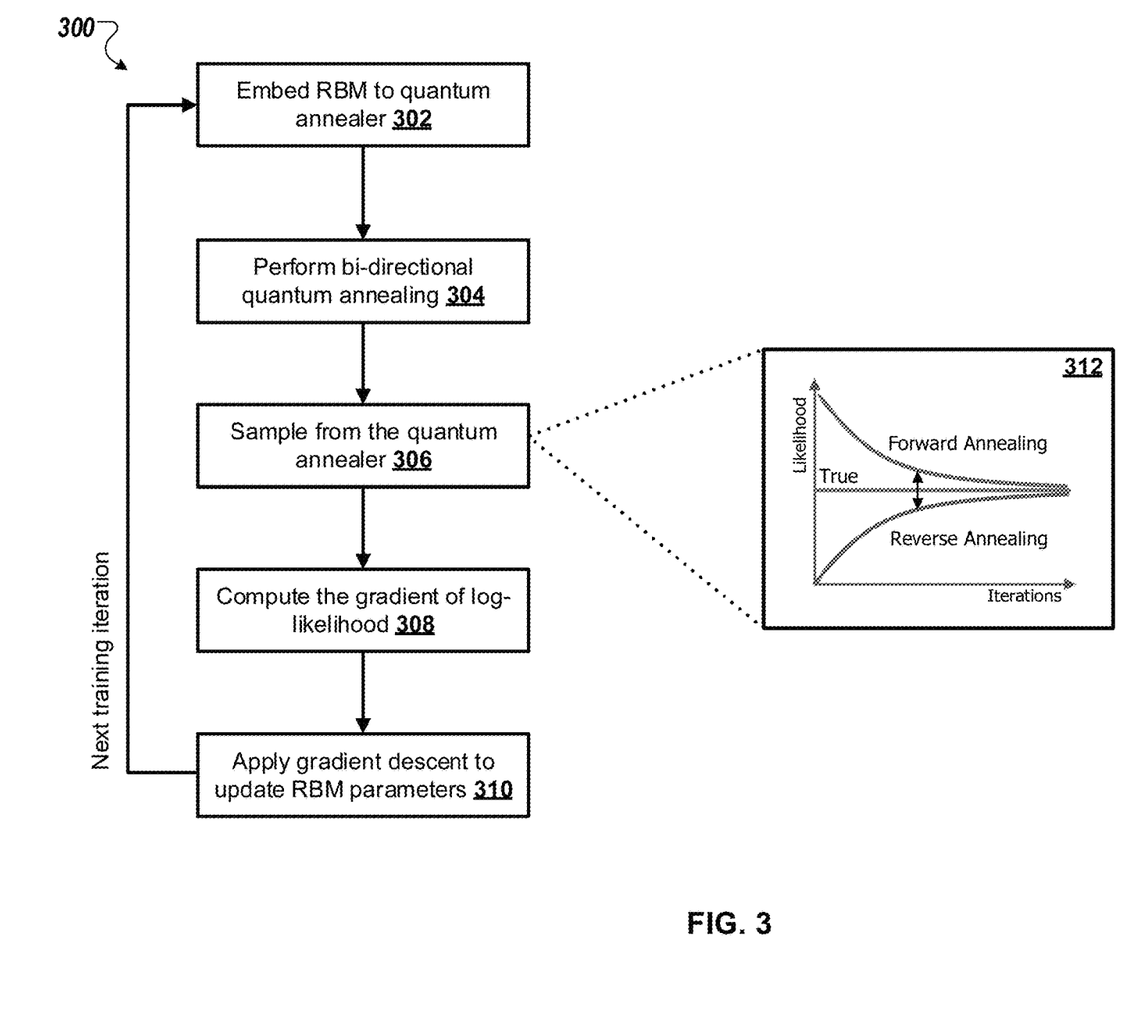
FIG. 3 is a flowchart of an example process for training one layer of a deep quantum restricted Boltzmann machine.

FIG. 3 is a flowchart of an example process 300 for training one layer of a deep QRBM. For convenience, the process 300 will be described as being performed by a system of one or more classical and quantum computing devices located in one or more locations. For example, example system 100 of FIG. 1, appropriately programmed in accordance with this specification, can perform the process 300.

Each layer of the multiple layers included in the deep QRBM includes a restricted Boltzmann machine (RBM). The goal of the training of an RBM is to maximize the likelihood of the training data. In example process 300 this is achieved by applying gradient descent where the cost function is the log-likelihood of the training data. Therefore, the computational problem is computing the gradient of the log-likelihood, which is known to be computationally hard. Classically, this is typically achieved using contrastive divergence, which lacks efficiency. This inefficiency applies to the quantum sampling of BMs in general, but holds a potential advantage in the special case of RBM, in which the neural network is bipartite and there are no cross terms between the nodes of the same sides.

The system embeds the respective RBM to a quantum annealer (step 302). For example, the energy function of an underlying Boltzmann (Gibbs) distribution of a Boltzmann machine (where Boltzmann machines are a class of generative graphical ML models) can be an Ising function or quadratic unconstrained binary optimization function. Therefore the sampling problem can be embedded on a quantum annealer by determining the energy function of the Boltzmann machine's underlying Boltzmann distribution and providing the energy function to a quantum annealing device. RBMs are a special case of BMs and allow more efficient sampling due to the underlying graph being bipartite.

The quantum annealer receives the embedded RBM, e.g., energy function, and performs quantum annealing on a quantum system included in the quantum annealer using the energy function (step 304). After performing the quantum annealing routine, the quantum system is in a state that is a low energy state of the Ising function or QUBO function. Measurement of the state provides a sample of the target Boltzmann (Gibbs) distribution.

However, without verifying the quality of the sample, it is not possible to know if the sample is from a distribution that is close to the target distribution or not. Therefore, the quantum annealer performs a bi-directional quantum annealing routine on the quantum system included in the quantum annealer using the energy function. That is, in addition to performing traditional (forward) quantum annealing on the quantum system using the energy function, the quantum annealer also performs reverse quantum annealing on the quantum system using the energy function. Unlike forward quantum annealing in which the system starts with the full transverse Hamiltonian, which is gradually and monotonically turned off, reverse quantum annealing starts with the full transverse Hamiltonian being turned off, and monotonically being turned on and then off. This allows the system to start at a particular classical state of interest, e.g., a classical state computed by the system using a classical heuristic, and the reverse annealing procedure can be understood as an exploration of some neighbourhood of that initial classical state. Reverse annealing can be useful in the scenario in which there is certain knowledge regarding in which localities the optima are likely to be located.

The combination of forward quantum annealing and reverse quantum annealing is referred to herein as bi-directional quantum annealing. In some implementations the quantum annealer can independently perform forward quantum annealing and reverse quantum annealing in sequence, e.g., the quantum annealer can perform forward quantum annealing on the quantum system to obtain a first sample of the target Boltzmann (Gibbs) distribution, initialize the quantum system, and subsequently perform reverse quantum annealing on the initialized quantum system to obtain a second sample of the target Boltzmann (Gibbs) distribution. In other implementations the quantum annealer can include multiple independent quantum systems and can perform forward quantum annealing and reverse quantum annealing in parallel to obtain a first and second sample of the target Boltzmann (Gibbs) distribution. In other implementations the system can provide different quantum annealing devices with the embedded RBM with instructions for the different quantum annealing devices to perform either forward or reverse quantum annealing using the energy function.

As shown in graph 312 of FIG. 3, in some implementations the quantum annealer(s) can perform multiple iterations of forward and reverse quantum annealing using the energy function to obtain multiple samples of the target Boltzmann (Gibbs) distribution. These samples can be processed to determine a sample that is closest to the target distribution. For example, by construction the iterations of forward quantum annealing can produce a first bound for a true sample of the target Boltzmann distribution and the iterations of reverse quantum annealing can produce a second bound for the true sample of the target Boltzmann distribution, where the true sample is sandwiched in between these two bounds. The system can determine a sample that is closest to the target distribution by identifying where the two bounds most closely agree. For example, in graph 312 of FIG. 3 the bounds converge with an increasing number of iterations. Therefore the system can determine a sample that is closest to the target distribution when the bounds agree to within a predetermine threshold.

The presently described bi-directional quantum annealing method is analogous to classical approaches of annealed importance sampling (AIS) estimators and reverse AIS estimators (RAISE). In the classical AIS estimator and RAISE, the probability distributions are evolved with a Markov process from a known distribution to a target distribution. In the presently described bi-directional quantum annealing, the evolution is defined for QRBM, in which each evolution is a reverse annealing run on the quantum annealer.

The bi-directional quantum annealing approach can improve the accuracy of evaluating probability distributions in MRF models. This improved accuracy is achieved by improving the quality of samples and potentially finding empirical bounds for errors. In addition, the training of MRF models can be enhanced from the improved sampling, and more efficient training protocols can be designed for MRF models.

The system receives one or more sampled target Boltzmann distributions from the quantum annealer (step 306). The system computes the gradient of the log-likelihood using the sampled target Boltzmann distributions (step 308). The gradient of the log-likelihood includes a sum of training data-dependent terms and model-dependent (depending on the vertex and edge parameters) terms. The former can be computed directly using the training data. The latter can be statistically computed, e.g., based on a set of samples drawn from the RBM. The set of samples can be obtained by repeating step 304 described above.

The system applies gradient descent to update the RBM parameters (step 310). According to the gradient descent algorithm, the parameters are updated by taking a small step towards the direction that has the most decrease in cost function. The parameters can be greedily updated over many iterations until a stopping criteria is met, e.g., when the magnitude of the parameter update frequently falls below a given small threshold in the last couple of iterations.

Figure 4:
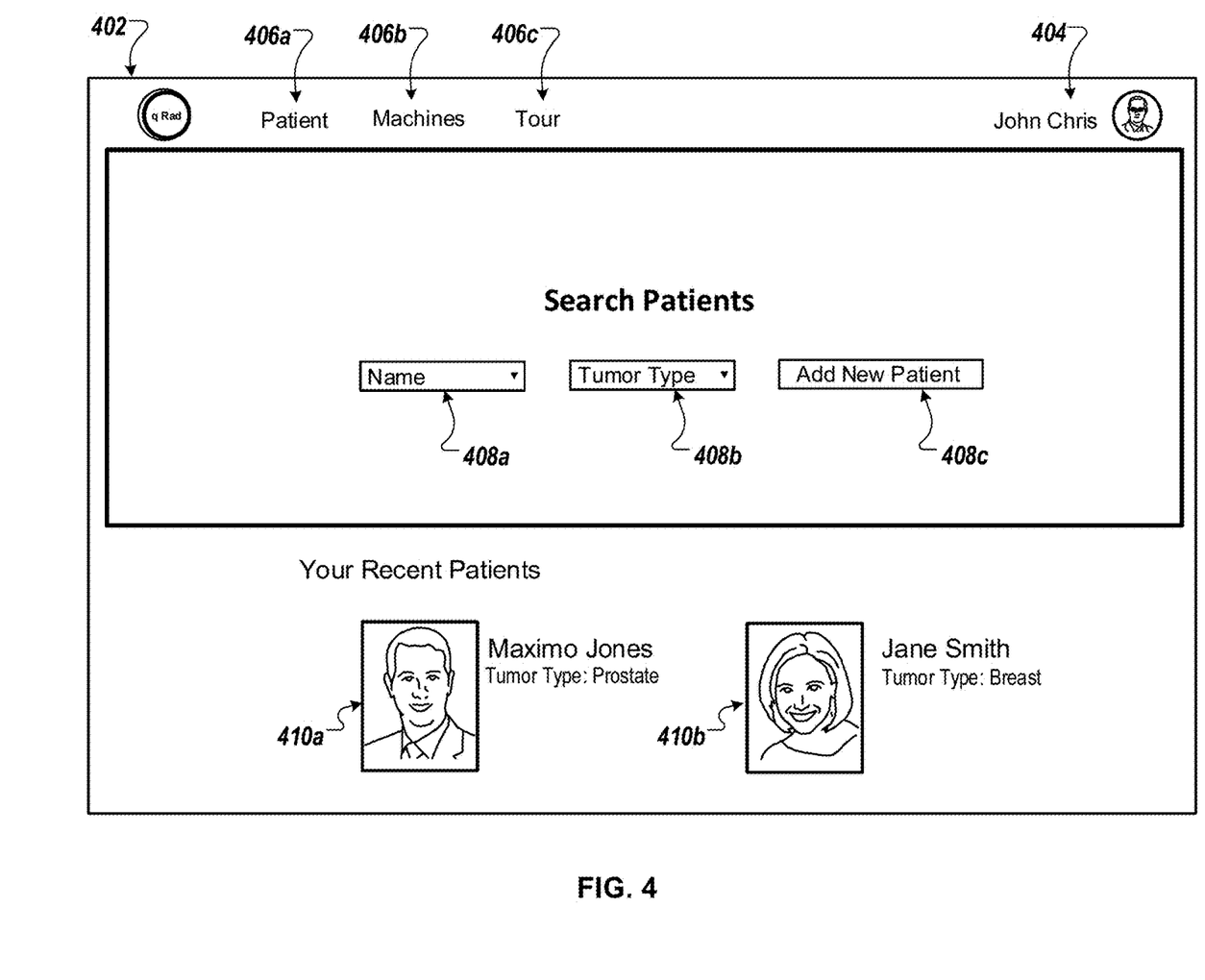
FIGS. 4-9 show example user interface presentations.

FIG. 4 shows an example user interface presentation 402. The user interface presentation 402 can be displayed when a user John Chris 404 has successfully logged in to an IMRT treatment plan system. The user interface presentation 402 includes options 406a-b which, when selected by the user, causes the user interface presentation 402 to present different types of information.

For example, in response to the user selecting the patient option 406a, the user interface presentation 402 presents options 408a-c for searching a patient database or adding a new record to a patient database. Option 408a is a search field that enables a user to search the patient database based on patient name. In some implementations, user selection of option 408a can cause the user interface presentation 402 to display a drop down list of patients, e.g., in alphabetical order. In response to user selection of a patient included in the drop down list, a user interface presentation showing data related to the patient can be displayed, as described below with reference to FIG. 5. In some implementations, a user can input a patient name in option 408a. Input of a patient name can cause the user interface presentation 402 to display search results matching the input patient name, e.g., as a list of patients in alphabetical order. In response to user selection of a patient included in the search results, a user interface presentation showing data related to the patient can be displayed, as described below with reference to FIG. 6.

Option 408b is a search field that enables a user to search the patient database based on tumor type. In some implementations user selection of option 408b can cause the user interface presentation 402 to display a drop down list of tumor types, e.g., in alphabetical order. In response to user selection of a tumor type included in the drop down list, a user interface presentation showing patients diagnosed with the tumor type can be displayed. User selection of a patient with a tumor of the tumor type can cause the user interface presentation to display data related to the patient, as described below with reference to FIG. 6. In some implementations a user can input a tumor type in option 408a. Input of a tumor type can cause the user interface presentation 402 to display search results matching the input tumor type, e.g., as a list of tumor types in alphabetical order. In response to user selection of a tumor type included in the search results, a user interface presentation showing patients diagnosed with the tumor type can be displayed. User selection of a patient with a tumor of the tumor type can cause the user interface presentation to display data related to the patient, as described below with reference to FIG. 6.

Option 408c enables a user to add a new record to the patient database.

In some implementations, in response to the user selecting the patient option 406a, the user interface presentation 402 can present icons 410a-b representing patients recently viewed by the user, e.g., in a last login session or prior to selection of the patient option 406a. User selection of an icon 410a or 410b can cause the user interface presentation to display data related to the corresponding patient, as described below with reference to FIG. 6.

In response to the user selecting the machine option 406b the user can be presented with an overview of available machines.

Figure 5:
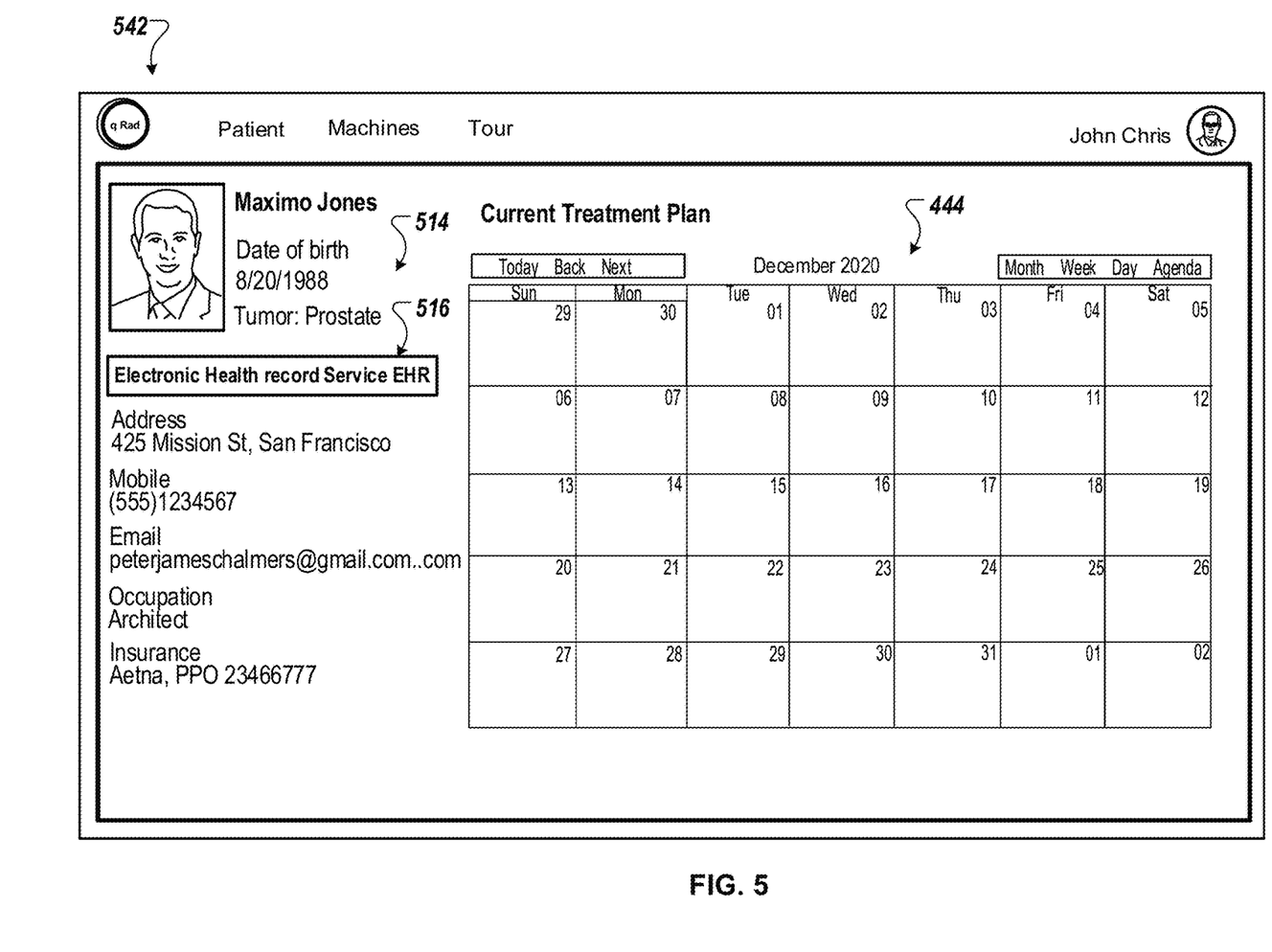

FIG. 5 shows an example user interface presentation 542. The user interface presentation 542 shows data relating to a patient undergoing IMRT, e.g., as selected by a user through user interface 402. A first portion 514 of the user interface presentation 542 displays personal information for the patient, e.g., patient name, date of birth, contact details, address, and insurance provider. In some implementations the first portion 514 can include an option 516 which, when selected, opens an electronic health record for the patient.

The user interface presentation 542 also displays a calendar view 544 and enables a user to view the dates and details of previously generated treatment plans, and to add a new upcoming calculated treatment plans. A user can select a previously generated plan and view or adjust the plan. For example, a user may select a planned treatment and adjust values associated with the treatment plan to update the treatment plan or calculate a new plan. Selection of a previously generated plan can cause the user interface presentation 542 to display a new presentation, through which the user can select and adjust previously entered information, e.g., IMRT volume-dose constraints. Selection of a calendar date can cause the user interface presentation 542 to display a new presentation, through which the user can enter information to generate a new treatment plan.

Figure 6:
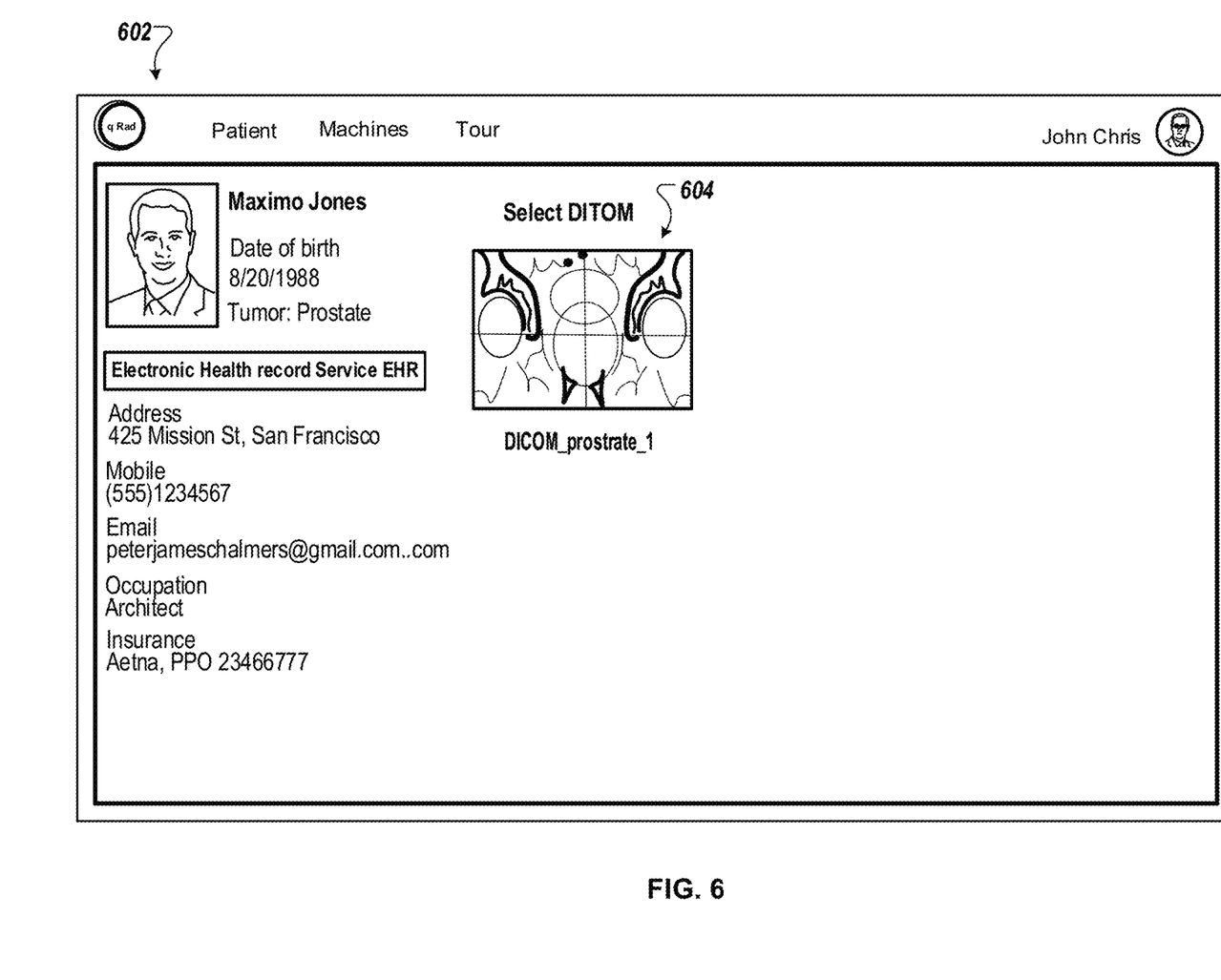

FIG. 6 shows an example user interface presentation 602. The user interface presentation 602 displays one or more of the patient's medical imaging images 604. The user can request that the image be processed and labelled using a trained image classifier, e.g., a deep quantum restricted Boltzmann machine trained using example process 200, by selecting the image.

Figure 7:
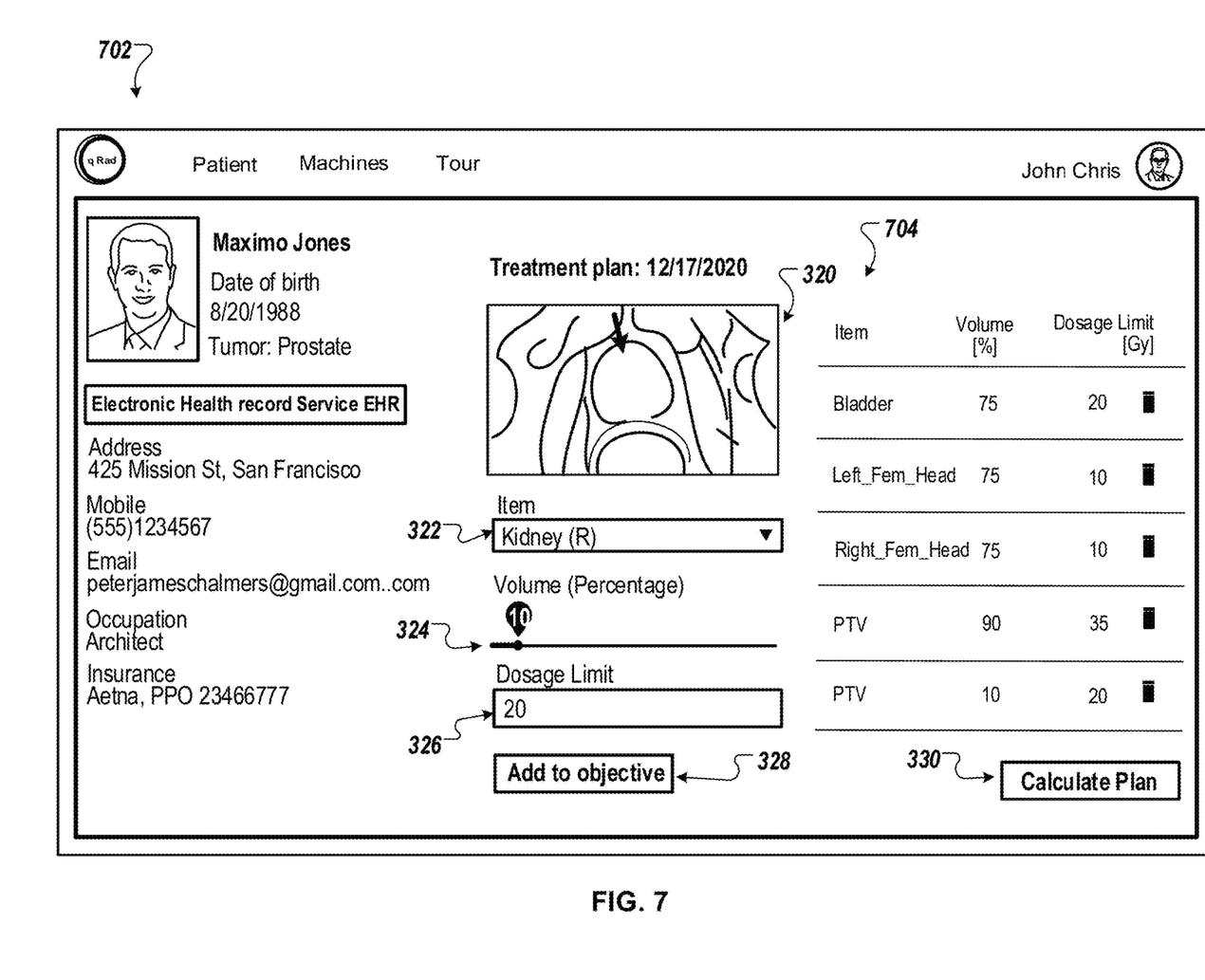

FIG. 7 shows an example user interface presentation 702. The user interface presentation 702 includes a portion 704 that enables the user to interact with the IMRT treatment system to calculate an optimal IMRT treatment plan for the patient. For example, the second portion 704 of the user interface presentation 702 includes a labelled image, e.g., a most recent image, of the patient's tumor. The labelled image can be obtained from a trained mage classifier, e.g., a deep quantum restricted Boltzmann machine trained using example process 200. In addition, the second portion 704 of the user interface presentation 702 includes options for inputting data including tumour type, location, and volume-dose constraints, e.g., data specifying an objective function to be minimized (or maximized) with respect to a set of parameters and data representing constraints for the minimization (or optimization). For example, one option enables the user to input a target body structure or body structure at risk from the treatment, where the target body structure or body structure at risk has been identified and labelled by the image classifier. Another option enables the user to select a volume of the body structure, e.g., as a percentage. Another option enables the user to select a dosage limit for the volume of the body structure. After the user completes the options, the user can select the add to objective option to add the volume-dose constraint to an IMRT objective function. When a user has entered all required volume-dose constraints for one or more body structures, the user can request a corresponding IMRT treatment plan by selecting the calculate plan option.

Figure 8:
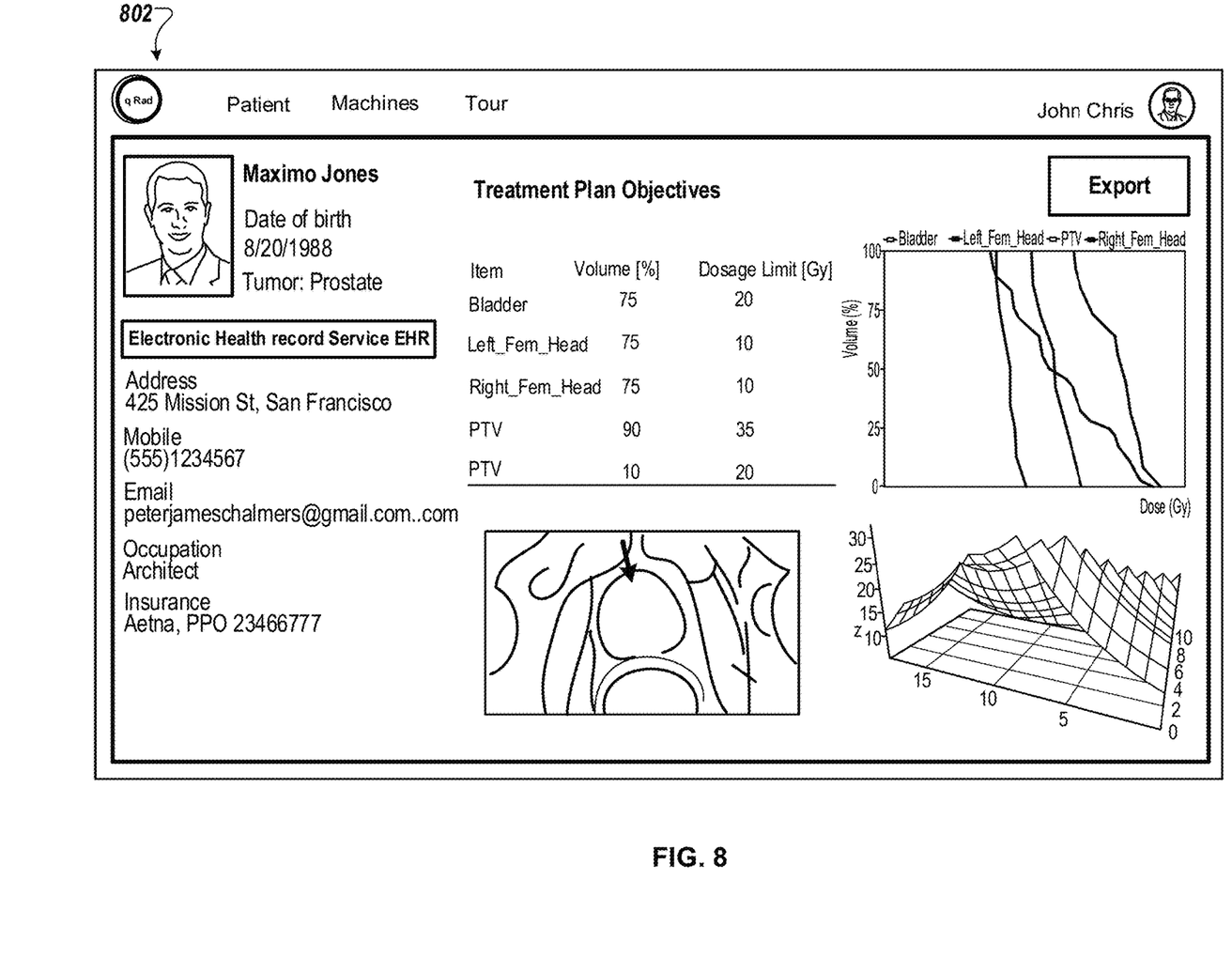

FIG. 8 shows an example user interface presentation 802. The user interface presentation 802 shows information relating to a corresponding IMRT treatment plan. For example, the user interface presentation 802 includes a summary of the volume-dose constraints input by the user and the labelled image of the tumor shown in the example user interface presentation 702.

The user interface presentation 802 further includes graphs that enable the user to visualize the solution to the IMRT treatment plan problem, e.g., the generated treatment plan. One graph shows a dose-volume histogram for each input body structure. Another graph shows a three-dimensional representations of the generated treatment plan, where the surface can be coloured according to Gy intensity. The user can export the generated plan by selection of the export option. For example, the user can export the generated plan as machine instructions which can be directly transmitted to a IMRT machine to program the machine to execute the generated treatment plan.

Figure 9:
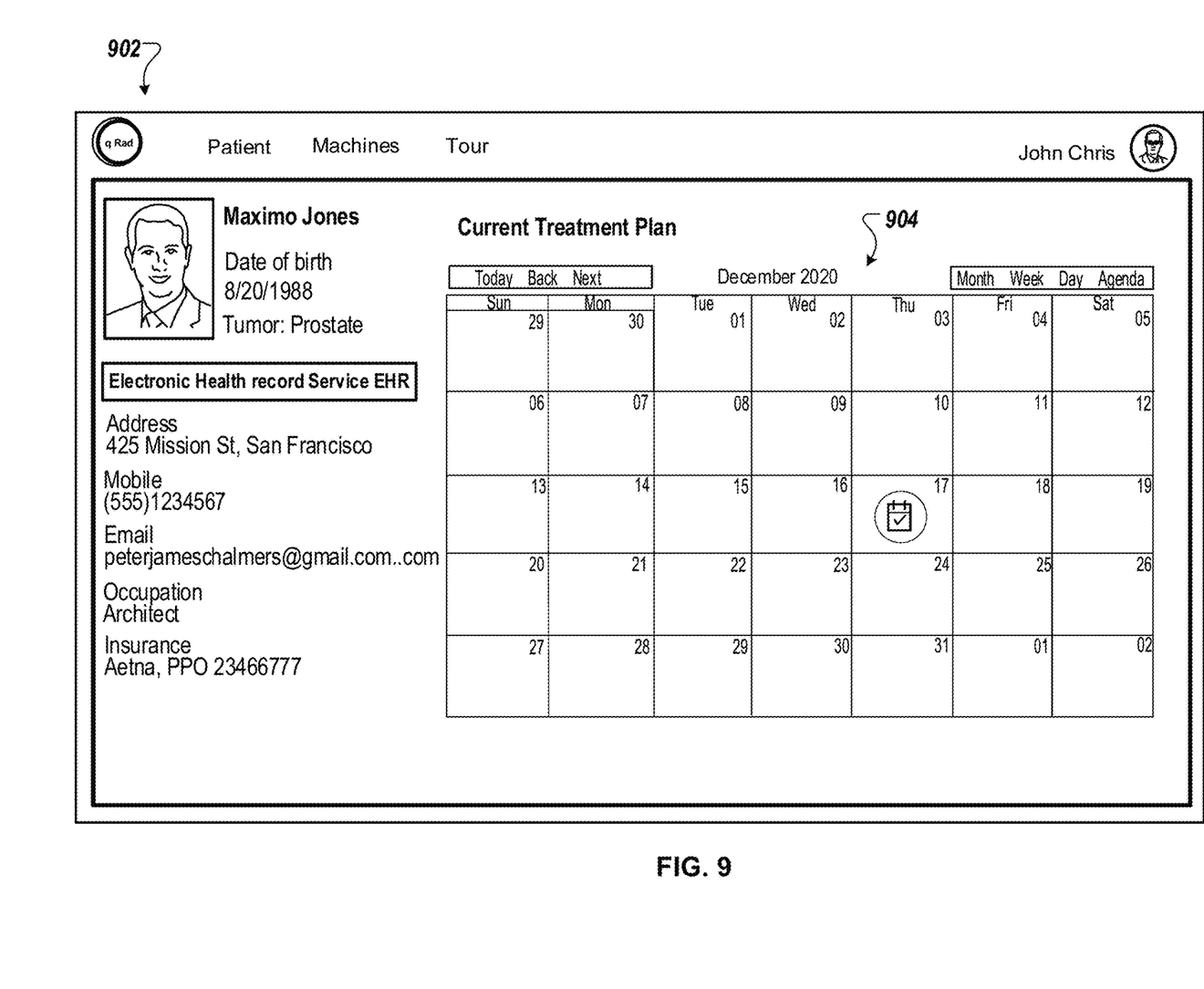

FIG. 9 shows an example user interface presentation 902. The user interface presentation 902 displays a calendar view and enables a user to view the dates and details of previously generated treatment plans, including the treatment plan generated in user interface presentations 702 and 802 of FIGS. 7 and 8.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for training an image classifier, comprising:
   obtaining training data comprising features extracted from a first set of images;
   training a deep quantum restricted Boltzmann machine (QRBM) comprising multiple layers using the training data, the training comprising layer-wise training of the multiple layers, wherein each layer of the multiple layers included in the deep QRBM comprises a restricted Boltzmann machine (RBM) and training each layer of the multiple layers comprises evaluating the RBM probability distribution using bi-directional quantum annealing;
   validating the trained deep QRBM using test data comprising features extracted from a second set of images; and
   evaluating, using the bi-directional quantum annealing, probability distributions in Markov Random Field (MRF) models,
   wherein a quantum computing resource implements the bi-directional annealing.

2. The method of claim 1, wherein images in the first set of images and second set of images comprise medical imaging images.

3. The method of claim 1, wherein training each layer of the multiple layers included in the deep QRBM comprises:
   embedding the RBM into a quantum annealing device;
   receiving a sampled target Boltzmann distribution from the quantum annealing device;
   computing a gradient of a log-likelihood function; and
   applying gradient descent to update parameters of the RBM.

4. The method of claim 3, wherein embedding the RBM into a quantum annealing device comprises:
   determining an energy function of the RBM underlying Boltzmann distribution; and
   providing the energy function to a quantum annealing device, wherein the quantum annealing device implements bi-directional quantum annealing.

5. The method of claim 4, wherein the energy function comprises an Ising function or a quadratic unconstrained binary optimization (QUBO) function and the target Boltzmann distribution corresponds to a low energy state of the Ising function or QUBO function.

6. The method of claim 4, wherein implementing bi-directional quantum annealing comprises performing forward quantum annealing and reverse quantum annealing.

7. The method of claim 4, wherein implementing bi-directional quantum annealing comprises independently performing forward quantum annealing and reverse quantum annealing in sequence.

8. The method of claim 4, wherein implementing bi-directional quantum annealing comprises performing forward quantum annealing and reverse quantum annealing in parallel using respective quantum systems.

9. The method of claim 3, wherein the gradient of the log-likelihood function comprises terms that are dependent on the training data, and wherein computing the gradient of the log-likelihood function comprises directly computing the terms that are dependent on the training data.

10. The method of claim 3, wherein the gradient of the log-likelihood function comprises terms that are dependent on the RBM, and wherein computing the gradient of the log-likelihood function comprises statistically computing the terms that are dependent on the RBM based on multiple samples drawn from the RBM.

11. The method of claim 1, wherein evaluating a restricted Boltzmann machine (RBM) probability distribution using bi-directional quantum annealing comprises:
   receiving multiple samples of the probability distribution obtained using forward annealing and computing a first bound for a true sample of the probability distribution;
   receiving multiple samples of the probability distribution obtained using reverse annealing and computing a second bound for a true sample of the probability distribution, wherein the true sample of the probability distribution is in between the first bound and the second bound;

determining a sample that is closest to the probability distribution using the first bound and the second bound.

12. The method of claim 11, wherein determining a sample that is closest to the probability distribution using the first bound and the second bound comprises identifying a position at which the first bound and the second bound most closely agree.

13. The method of claim 1, further comprising, in response to determining that validation criteria are met, providing the trained deep QRBM for image classification of new images.

14. The method of claim 1, further comprising, in response to determining that validation criteria are not met, repeating training and validating of the deep QRBM.

15. The method of claim 1, further comprising performing, by a quantum annealing device, bi-directional quantum annealing to evaluate the RBM probability distribution.

16. The method of claim 15, wherein the quantum annealing device comprises a Noisy Intermediate-Scale Quantum (NISQ) device.

17. The method of claim 1, wherein images in the first set of images and second set of images are other than medical imaging images.

18. A system comprising one or more computers and one or more storage devices storing instructions that are operable, when executed by the one or more computers, to cause the one or more computers to perform operations for training an image classifier, comprising:

obtaining training data comprising features extracted from a first set of images;

training a deep quantum restricted Boltzmann machine (QRBM) comprising multiple layers using the training data, the training comprising layer-wise training of the multiple layers, wherein each layer of the multiple layers included in the deep QRBM comprises a restricted Boltzmann machine (RBM) and training each layer of the multiple layers comprises evaluating the RBM probability distribution using bi-directional quantum annealing;

validating the trained deep QRBM using test data comprising features extracted from a second set of images; and evaluating, using the bi-directional quantum annealing, probability distributions in Markov Random Field (MRF) models, wherein a quantum computing resource implements the bi-directional annealing.

19. The system of claim 18, further comprising a quantum annealing device, wherein the quantum annealing device is configured to perform bi-directional quantum annealing to evaluate the RBM probability distribution.

20. The system of claim 19, wherein performing bi-directional quantum annealing comprises performing forward quantum annealing and reverse quantum annealing.

21. The system of claim 19, wherein the quantum annealing device comprises a Noisy Intermediate-Scale Quantum (NISQ) device.

* * * * *